US011401431B2

(12) United States Patent
Iu et al.

(10) Patent No.: US 11,401,431 B2
(45) Date of Patent: Aug. 2, 2022

(54) THERMAL INKJET INK AND COLORLESS PRE-TREATMENT FLUID

(71) Applicant: HEWLETT-PACKARD DEVELOPMENT COMPANY, L.P., Spring, TX (US)

(72) Inventors: Kai-Kong Iu, San Diego, CA (US); Howard Doumaux, San Diego, CA (US); Stone S. Ouyang, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 72 days.

(21) Appl. No.: 16/608,175

(22) PCT Filed: Oct. 25, 2017

(86) PCT No.: PCT/US2017/058309
§ 371 (c)(1),
(2) Date: Oct. 24, 2019

(87) PCT Pub. No.: WO2019/083524
PCT Pub. Date: May 2, 2019

(65) Prior Publication Data
US 2020/0248021 A1    Aug. 6, 2020

(51) Int. Cl.
    *C09D 11/38*    (2014.01)
    *C08G 77/18*    (2006.01)
    (Continued)

(52) U.S. Cl.
    CPC ............. *C09D 11/38* (2013.01); *C08G 77/18* (2013.01); *C09D 11/322* (2013.01); *C09D 11/40* (2013.01); *C09D 11/54* (2013.01)

(58) Field of Classification Search
    CPC ..... C09D 11/40; C09D 11/102; C09D 11/322; C09D 11/54
    See application file for complete search history.

(56) References Cited

U.S. PATENT DOCUMENTS

| 6,087,416 A | 7/2000 | Pearlstine et al. |
| 7,935,842 B2 | 5/2011 | Policello et al. |

(Continued)

FOREIGN PATENT DOCUMENTS

| WO | WO2004108949 A1 | 12/2004 | |
| WO | WO2015023274 A1 | 2/2015 | |
| WO | WO 2017060153 A1 * | 4/2017 | .............. B41M 5/00 |

OTHER PUBLICATIONS

Chen, Yao-Bin et al., "Synthesis,properties and Applications of Trisiloxane Surfactants", Apr. 2010, http://en.cnki.com.cn/Article_en/CJFDTOTAL-CHEM201004013.htm.

(Continued)

*Primary Examiner* — Khanh T Nguyen
(74) *Attorney, Agent, or Firm* — Dierker & Kavanaugh PC

(57) ABSTRACT

A thermal inkjet ink includes a water-based vehicle; a colorant; and a modified siloxane surfactant including a plurality of components. Each component has a chemical formula I: $Si_{(1+x+z)}O_{(1+x+z+y)}C_{(1+1+2(x+z)+j+m+y(2+n))}H_{(6+6+6(x+z)+o+p+y(4+q))}$. For each component: y ranges from 2 to 4; x and z each range from 0 to 14; x+z=from 0 to 14; j, m, and n are the number of carbon atoms, respectively, in $R_1$, $R_2$, and $R_3$; o, p, and q are the number of hydrogen atoms, respectively, in $R_1$, $R_2$, and $R_3$. $R_1$ is selected from H, an alkyl, and an aryl. Each of R2 and R3 is selected from H, an alkyl, an alkyl substituted with an allylic or an epoxy group, an aryl, and an aryl substituted with an allylic or an epoxy group. For some components: x+z=from 7 to 14.

17 Claims, 6 Drawing Sheets

(51) Int. Cl.
  *C09D 11/322* (2014.01)
  *C09D 11/40* (2014.01)
  *C09D 11/54* (2014.01)

(56) References Cited

U.S. PATENT DOCUMENTS

| | | |
|---|---|---|
| 7,964,032 B2 | 6/2011 | Rajaraman et al. |
| 8,256,884 B2 | 9/2012 | Wheeler |
| 2012/0088865 A1 | 4/2012 | Policello et al. |
| 2014/0253631 A1* | 9/2014 | Namba ............... B41J 2/01 347/21 |
| 2014/0364548 A1* | 12/2014 | Everhardus .......... C09D 11/322 524/265 |
| 2016/0024323 A1* | 1/2016 | Tamai .................. C09D 11/40 347/21 |
| 2016/0333208 A1* | 11/2016 | Gotou ................. C09D 11/322 |
| 2017/0166764 A1* | 6/2017 | Katsuragi ............ C09D 11/102 |
| 2018/0222234 A1* | 8/2018 | Markies ............... B41M 5/0017 |
| 2019/0225828 A1* | 7/2019 | Cagle .................. C09D 11/54 |

OTHER PUBLICATIONS

Peery, D., "Silicone Surface-active Agents", Dec. 21, 2005, Dow Corning Corporation; http://www.dowcorning.com/content/publishedlit/26-1365.pdf.

* cited by examiner

```
                                    ┌─ 102
   100                               │
      ↘

┌─────────────────────────────────────────────────────────────────────┐
   │     Incorporating a Modified Siloxane Surfactant into a Vehicle Including Water and an
   │  Organic Co-solvent Having a Boiling point Ranging from 75°C to 250°C, the Modified
   │  Siloxane Surfactant Including a Plurality of Components, Wherein Each of the Plurality of
   │  Components has a Chemical Formula:
   │
   │         $Si_{(1+x+z)} O_{(1+x+z+y)} C_{(1+1+2(x+z)+j+m+y(2+n))} H_{(6+6+6(x+z)+o+p+y(4+q))}$
   │
   │  Wherein for Each of the Plurality of Components:
   │      y Ranges from 2 to 4;
   │      x Ranges from 0 to 14;
   │      z Ranges from 0 to 14;
   │      x + z = from 0 to 14;
   │      j is a Number of Carbon Atoms in $R_1$, Wherein $R_1$ is Selected from the group
   │  Consisting of H, an Alkyl, and an Aryl;
   │      m is a Number of Carbon Atoms in $R_2$, Wherein $R_2$ is Selected from the group
   │  Consisting of H, an Alkyl, an Alkyl Substituted with an Allylic Group, an Alkyl Substituted
   │  with an Epoxy Group, an Aryl, an Aryl Substituted with an Allylic Group, and an Aryl
   │  Substituted with an Epoxy Group;
   │      n is a Number of Carbon Atoms in $R_3$, Wherein $R_3$ is Selected from the group
   │  Consisting of H, an Alkyl, an Alkyl Substituted with an Allylic Group, an Alkyl Substituted
   │  with an Epoxy Group, an Aryl, an Aryl Substituted with an Allylic Group, and an Aryl
   │  Substituted with an Epoxy Group;
   │      o is a Number of Hydrogen Atoms in $R_1$;
   │      p is a Number of Hydrogen Atoms in $R_2$; and
   │      q is a Number of Hydrogen Atoms in $R_3$; and
   │  and Wherein for Some of the Plurality of Components: x + z = from 7 to 14
   └─────────────────────────────────────────────────────────────────────┘
                   │                                    │
                   ▼                                    ▼
   ┌──────────────────────────────────┐   ┌──────────────────────────────────┐
   │  Forming a Thermal Inkjet Ink by │   │  Forming a Colorless Pre-treatment Fluid by │
   │  Incorporating a Colorant and an │   │  Incorporating a Cationic, Polymeric Fixing │
   │  Anionic Polymeric Binder into   │   │  Agent and an Organic Acid into the Vehicle │
   │  the Vehicle                     │   │                                             │
   └──────────────────────────────────┘   └──────────────────────────────────┘
         104 ─┘                                              └─ 106
```

*Fig-1*

THERMAL INKJET INK AND COLORLESS PRE-TREATMENT FLUID

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a flow diagram illustrating examples of a method disclosed herein;

DETAILED DESCRIPTION

Figure 2A:
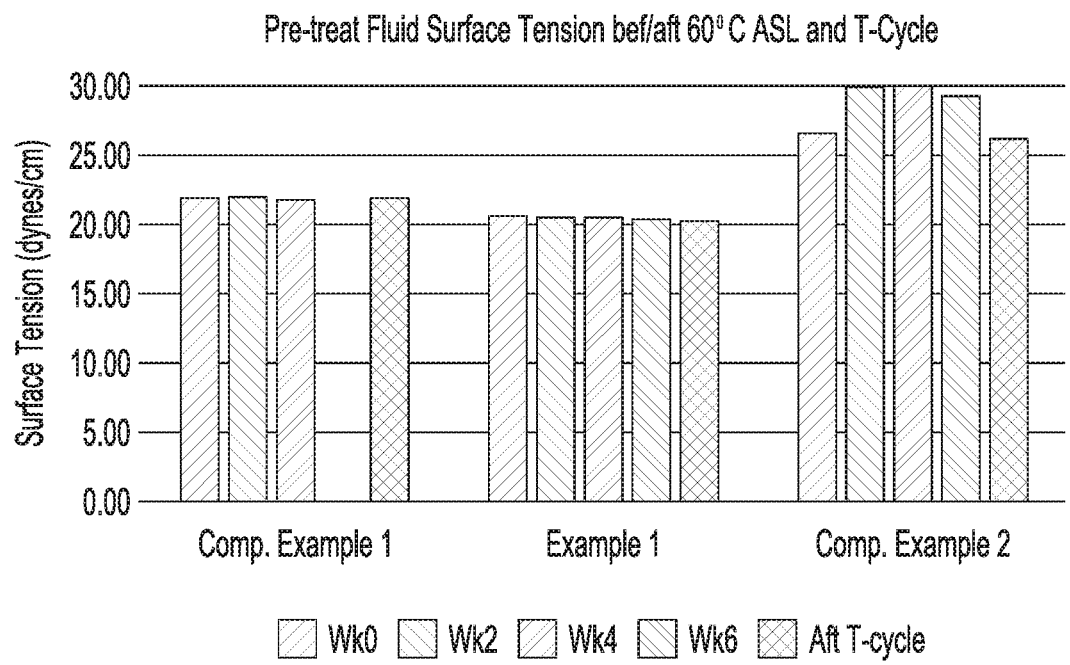
FIG. 2A is a bar graph depicting the surface tension (dynes/cm, Y-axis) of different pre-treatment fluids before accelerated storage testing and temperature-cycle testing (i.e., Wk 0), and then at different time periods after accelerated storage (i.e., Wks 2, 4, 6) and after the temperature-cycle (i.e., Aft T-cycle)

Digital inkjet printing of signs and other graphic arts applications is increasingly replacing screen printing and other analog printing technologies. Many of the media substrates for these types of applications are non-porous media, including some coated papers and polymer films. Non-porous media can be challenging to print on with aqueous thermal inkjet fluids, in part because of the lack of porosity in, and the hydrophobic nature of the non-porous media.

Examples of the thermal inkjet inks and the pre-treatment fluids disclosed herein are shown to exhibit surface tension stability over time. In some examples, the surface tension ranges from about 18 dynes/cm to about 22 dynes/cm. This range renders the thermal inkjet inks and pre-treatment fluids disclosed herein particularly suitable for being digitally printed on non-porous media, including plastic substrates, such as vinyl, polycarbonate, acrylic, polyethylene, and polypropylene.

The surface tension stability of the thermal inkjet inks and the pre-treatment fluids disclosed herein is also unexpected because the inks and the pre-treatment fluids are water-based and include a modified siloxane surfactant. Siloxane chains are known to hydrolyze over time in water, and thus it would be expected that an increase in surface tension would take place over time. Increased surface tension of a thermal inkjet ink or pre-treatment fluid can cause the ink or fluid to bead up when printed on non-porous media, leading to increased white space on the media, poor wetting, and aesthetically unpleasing printed images. However, it has been found that the modified siloxane surfactant used in the thermal inkjet inks and the pre-treatment fluids disclosed herein does not experience an increase in surface tension, even after being exposed to accelerated storage and a temperature cycle. The data set forth herein illustrates that the modified siloxane surfactants used in the examples of the thermal inkjet inks and the pre-treatment fluids include some components with shorter siloxane chains and some components with longer siloxane chains, and that the latter components are less susceptible to surface tension increase. As such, even though some hydrolysis may be taking place, the thermal inkjet inks and the pre-treatment fluids are able to maintain their surface tension and printability on non-porous media.

The thermal inkjet inks and the pre-treatment fluids have also been shown to perform similarly to or better than some typical fluorinated surfactants. As such, the thermal inkjet inks and the pre-treatment fluids disclosed herein do not include fluorinated surfactants.

The stability performance can be measured in terms of surface tension. The term "surface tension stability," as referred to herein, means the ability of the surface tension of the thermal inkjet ink or of the pre-treatment fluid to remain substantially unchanged over time. To determine the surface tension stability, the change in surface tension may be measured over time, and the percent change may be calculated. The surface tension may be considered to be "substantially unchanged over time" when the change in surface tension is less than 2.5 dynes/cm in both an accelerated storage environment test and a Temperature-cycle test.

To facilitate the measurement of the surface tension percentage change, the ink or pre-treatment formulation may be stored in an accelerated storage (AS) environment. The surface tension may be measured before and after the ink or pre-treatment formulation has been stored in the AS environment. The accelerated storage environment may be an environment that has a temperature ranging from about 45° C. to about 60° C. In an example, the accelerated storage environment is an oven baked at a temperature of about 60° C. and the ink and pre-treatment formulation is stored in the AS environment for about one week, two weeks, or six weeks.

An additional way to facilitate the measurement of the surface tension percentage change is to subject ink or pre-treatment formulation to a Temperature-cycle (T-cycle). When conducting the T-cycle test, the surface tension may be measured before and after the ink or pre-treatment formulation has undergone the T-cycle. The T-cycle may involve heating the ink or pre-treatment formulation to a high temperature and then maintaining the ink or pre-treatment formulation at the high temperature for a few minutes, and then cooling the ink or pre-treatment formulation to a low temperature and maintaining the ink or pre-treatment formulation at the low temperature for a few minutes. The process may be repeated for a number of cycles (e.g., 5).

The T-cycle test may indicate an instability in the ink or pre-treatment formulation that is not indicated by an AS environment test. Conversely, an AS environment test may indicate an instability in the ink or pre-treatment formulation that is not indicated by a T-cycle test. As noted above, a stable ink or pre-treatment formulation and a stable pre-treatment formulation should be able pass both an AS environment test and a T-cycle test.

As mentioned above, both thermal inkjet inks and pre-treatment fluids (which are printable via a thermal inkjet printer) are disclosed herein. A method 100, which may be used to make either an example of the thermal inkjet ink or an example of the pre-treatment fluid is shown in FIG. 1. In particular, as shown at reference numeral 102 of FIG. 1, the method 100 involves incorporating a modified siloxane surfactant into a vehicle including water and an organic co-solvent having a boiling point ranging from 75° C. to 250° C., the modified siloxane surfactant including a plurality of components, wherein each of the plurality of components has a chemical formula:

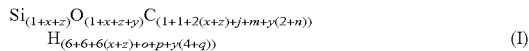

(I)

wherein for each of the plurality of components: y ranges from 2 to 4; x ranges from 0 to 14; z ranges from 0 to 14; x+z=from 0 to 14; j is a number of carbon atoms in $R_1$, wherein $R_1$ is selected from the group consisting of H, an alkyl, and an aryl; m is a number of carbon atoms in $R_2$, wherein $R_2$ is selected from the group consisting of H, an alkyl, an alkyl substituted with an allylic group, an alkyl substituted with an epoxy group, an aryl, an aryl substituted with an allylic group, and an aryl substituted with an epoxy group; n is a number of carbon atoms in $R_3$, wherein $R_3$ is selected from the group consisting of H, an alkyl, an alkyl substituted with an allylic group, an alkyl substituted with an epoxy group, an aryl, an aryl substituted with an allylic group, and an aryl substituted with an epoxy group; o is a number of hydrogen atoms in $R_1$; p is a number of hydrogen atoms in $R_2$; and q is a number of hydrogen atoms in $R_3$; and wherein for some of the plurality of components: x+z=from 7 to 14.

It is be understood that each of the plurality of components in the modified siloxane surfactant disclosed herein may be represented by the chemical formula:

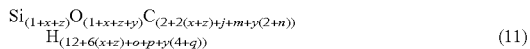

(11)

wherein for each of the plurality of components: y ranges from 2 to 4; x ranges from 0 to 14; z ranges from 0 to 14; x+z=from 0 to 14; j is a number of carbon atoms in $R_1$, wherein $R_1$ is selected from the group consisting of H, an alkyl, and an aryl; m is a number of carbon atoms in $R_2$, wherein $R_2$ is selected from the group consisting of H, an alkyl, an alkyl substituted with an allylic group, an alkyl substituted with an epoxy group, an aryl, an aryl substituted with an allylic group, and an aryl substituted with an epoxy group; n is a number of carbon atoms in $R_3$, wherein $R_3$ is selected from the group consisting of H, an alkyl, an alkyl substituted with an allylic group, an alkyl substituted with an epoxy group, an aryl, an aryl substituted with an allylic group, and an aryl substituted with an epoxy group; o is a number of hydrogen atoms in $R_1$; p is a number of hydrogen atoms in $R_2$; and q is a number of hydrogen atoms in $R_3$; and wherein for some of the plurality of components: x+z=from 7 to 14.

In some examples, as shown at reference numeral 104, the method 100 further includes forming a thermal inkjet ink by incorporating a colorant and an anionic polymeric binder into the vehicle.

In other examples, as shown at reference numeral 106, the method 100 further includes forming a colorless pre-treatment fluid by incorporating a cationic fixing agent and an organic acid into the vehicle.

The modified siloxane surfactant will now be described in more detail, as it is included in both examples of the thermal inkjet ink and examples of the pre-treatment fluid.

In chemical formula I and/or II, $R_1$ is selected from the group consisting of H, an alkyl, and an aryl. Also in chemical formula I and/or II, $R_2$, and $R_3$ are independently selected from the group consisting of an alkyl substituted with an allylic group, an alkyl substituted with an epoxy group, an aryl, an aryl substituted with an allylic group, and an aryl substituted with an epoxy group. Thus in chemical formula I and/or II, when $R_1$ is H, j will be 0 and o will be 1; when $R_2$ is H, m will be 0 and p will be 1; and when $R_3$ is H, n will be 0 and q will be 1. Similarly, when $R_1$ is an alkyl or an aryl, j will depend on the number of carbon atoms in the alkyl or aryl and o will depend on the number of hydrogen atoms in the alkyl or aryl; when $R_2$ is an alkyl, a substituted alkyl, an aryl, or a substituted aryl, m will depend on the number of carbon atoms in the alkyl, the substituted alkyl, the aryl, or the substituted aryl, and p will depend on the number of hydrogen atoms in the alkyl, the substituted alkyl, the aryl, or the substituted aryl; and when $R_3$ is an alkyl, a substituted alkyl, an aryl, or a substituted aryl, n will depend on the number of carbon atoms in the alkyl, the substituted alkyl, the aryl, or the substituted aryl and q will depend on the number of hydrogen atoms in the alkyl, the substituted alkyl, the aryl, or the substituted aryl.

The alkyl may be any straight hydrocarbon chain that is fully saturated (i.e., contains no double or triple bonds). The alkyl may have 1 to 20 carbon atoms. In an example, the alkyl may have 2 to 8 carbons atoms. Example alkyl groups include methyl, ethyl, propyl, isopropyl, butyl, isobutyl, tertiary butyl, pentyl, hexyl, and the like. As an example, the designation "C1-C4 alkyl" indicates that there are one to four carbon atoms in the alkyl chain, i.e., the alkyl chain is selected from the group consisting of methyl, ethyl, propyl, iso-propyl, n-butyl, isobutyl, sec-butyl, and t-butyl.

In the examples disclosed herein, each of $R_2$ and $R_3$ may be an alkyl substituted with an allylic group or an alkyl substituted with an epoxy group. These alkyls include branched hydrocarbon chains, where the hydrocarbon chain is fully saturated and an allylic group or an epoxy group is attached to a carbon atom of the hydrocarbon chain. The allylic group or the epoxy group is a cross-linkable functional group that renders the thermal inkjet ink or the colorless pre-treatment fluid curable via electron-beam or ultraviolet radiation. The allylic group may be the allylic ether: —O—$(CH_2)_n$—CH=$CH_2$, where n is 1 to 4, or the allylic group may be the allylic acrylate: O—CO—CH=$CH_2$, where CO is C=O. The epoxy group may be either —O—$(CH_2)_n$-epoxy or —$(CH_2)_n$-epoxy, where n is 1 to 4 and the epoxy is:

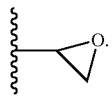

The aryl refers to an aromatic ring or ring system (i.e., two or more fused rings that share two adjacent carbon atoms) containing only carbon in the ring backbone. When the aryl is a ring system, every ring in the system is aromatic. The aryl group may have 6 to 18 carbon atoms, which may be designated as C6-18. Examples of aryl groups include phenyl, benzyl, naphthyl, azulenyl, and anthracenyl. In an example, the aryl is a polycyclic aromatic hydrocarbon, such as biphenyl or bibenzyl. Derivatives of phenyl, benzyl, biphenyl, or bibenzyl may also be used.

In the examples disclosed herein, each of $R_2$ and $R_3$ may be an aryl substituted with an allylic group or an aryl substituted with an epoxy group. These aryls may have the allylic group or the epoxy group attached to a carbon atom of the aromatic ring or ring system. As mentioned above, the allylic group or the epoxy group is a cross-linkable functional group that renders the thermal inkjet ink or the colorless pre-treatment fluid curable via electron-beam or ultraviolet radiation. The allylic group may be either the allylic ether or the allylic acrylate set forth herein. The epoxy group may be either of the groups set forth herein (i.e., —O—$(CH_2)_n$-epoxy or —$(CH_2)_n$-epoxy). For attachment of any of these groups to the aryl, the aryl may be missing 2 hydrogen atoms in the aromatic ring or ring system, creating potential attachment sites for the allylic or epoxy group.

In an example, each of $R_1$ and $R_2$ is a methyl and $R_3$ is a hydrogen. In this example, j and m will each be 1, n will be 0, o and p will each be 3, and q will be 1. In another example, each of $R_1$, $R_2$ and $R_3$ is a methyl. In this example, j, m, and n will each be 1, and o, p, and q will each be 3. In either of these examples, x may be 7 to 14, y may be 2 to 3, and z may be 0.

The modified siloxane surfactant includes a variety of components, each of which is in accordance with chemical formula I and/or II. Some of these components within the surfactant have x+z=from 7 to 14, and thus are considered to be longer chain siloxanes. As examples, x may be 0 and z may be any integer from 7 to 14, or z may be 0 and x may be any integer from 7 to 14, or x and z may each be any integer from 0 to 14 as long as x+z=from 7 to 14 (e.g., x=14 and z=0, x=7 and z=6, etc.). These longer chain components are believed to contribute to the surface tension stability of the inks and pre-treatment fluids disclosed herein. Some other of these components within the surfactant may have x+z=from 0 to 6, and thus are considered to be shorter chain siloxanes. As examples, x may be 0 and z may be any integer from 0 to 6, or z may be 0 and x may be any integer from 0 to 6, or x and z may each be any integer from 0 to 6 as long as x+z=from 0 to 6 (e.g., x=6 and z=0, x=1 and z=4, etc.).

In some of the examples disclosed herein, each of the plurality of components in the modified siloxane surfactant having chemical formula I and/or II also has a structure:

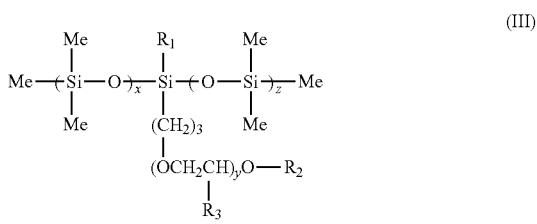

wherein Me is a methyl group, and x, y, z, $R_1$, $R_2$, and $R_3$ are each as defined for formula I and/or II. For some of the plurality of components (having structure III): y ranges from 2 to 3, x ranges from 7 to 14, and z is 0.

Examples of the thermal inkjet ink will now be described. Some examples of the thermal inkjet ink include a water-based vehicle; a colorant; and a modified siloxane surfactant including a plurality of components, wherein each of the plurality of components has a chemical formula:

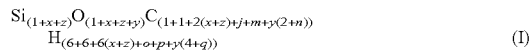

wherein for each of the plurality of components: y ranges from 2 to 4; x ranges from 0 to 14; z ranges from 0 to 14; x+z=from 0 to 14; j is a number of carbon atoms in $R_1$, wherein $R_1$ is selected from the group consisting of H, an alkyl, and an aryl; m is a number of carbon atoms in $R_2$, wherein $R_2$ is selected from the group consisting of H, an alkyl, an alkyl substituted with an allylic group, an alkyl substituted with an epoxy group, an aryl, an aryl substituted with an allylic group, and an aryl substituted with an epoxy group; n is a number of carbon atoms in $R_3$, wherein $R_3$ is selected from the group consisting of H, an alkyl, an alkyl substituted with an allylic group, an alkyl substituted with an epoxy group, an aryl, an aryl substituted with an allylic group, and an aryl substituted with an epoxy group; o is a number of hydrogen atoms in $R_1$; p is a number of hydrogen atoms in $R_2$; and q is a number of hydrogen atoms in $R_3$; and wherein for some of the plurality of components: x+z=from 7 to 14. In other examples of the thermal inkjet ink, the plurality of components in the modified siloxane surfactant may be represented by formula II.

In some examples of the ink, each of the plurality of components (of the modified siloxane surfactant) has structure III (as set forth above). In these examples, for some of the plurality of components: y ranges from 2 to 3, x ranges from 7 to 14, and z is 0.

The water-based vehicle of the thermal inkjet ink includes water and an organic-co-solvent having a boiling point ranging from 75° C. to 250° C. In an example, the water-based vehicle can include multiple co-solvents, each of which has a boiling point ranging from 75° C. to 250° C. Whether used alone or in combination, the total amount of the organic co-solvent(s) may be present in the thermal inkjet ink in an amount ranging from about 1 wt % to about 40 wt %. In an example, the organic co-solvent(s) may be present in the thermal inkjet ink in an amount ranging from about 1 wt % to about 22 wt %.

The boiling point of the organic co-solvent also contributes to the thermal inkjet ink being particularly suitable for printing on non-porous media. These particular organic solvents are capable of softening or swelling a surface of the non-porous medium, which adsorbs a portion of the water-based vehicle and allows the colorant to adhere to the surface of the medium. Suitable examples of the organic co-solvent may include alcohols, diols, glycols, glycol ethers, lactams, sulfoxides, or combinations thereof. Some specific examples of these organic co-solvents may include ethanol (bp about 78° C.), propylene glycol monopropyl ether (bp from about 140° C. to about 160° C.), propylene glycol n-propyl ether (bp about 149° C., commercially available from The Dow Chemical Co. as DOWANOL™ PnP), diethylene glycol isopropyl ether (bp from about 139° C. to about 144° C.), hexylene glycol (bp about 197° C.), propylene glycol n-butyl ether (bp about 171° C., commercially available from The Dow Chemical Co. as DOWANOL™ PnB), ethylene glycol phenyl ether (bp about 244° C.), tripropylene glycol methyl ether (bp about 243° C.), diethylene glycol (bp about 244° C.), propylene glycol (bp about 188° C.), ethylene glycol (bp about 197° C.), dipropylene glycol (bp about 230° C.), diethylene glycol monobutyl ether (bp about 231° C.), diethylene glycol monopropyl ether (bp from about 212° C. to about 216° C.), ethylene glycol monobutyl ether (bp about 171° C.), triethylene glycol monomethyl ether (bp about 246° C.), dipropylene glycol methyl ether (bp about 190° C., commercially available from The Dow Chemical Co. as DOWANOL™ DPM), diethylene glycol methyl ether (bp about 194° C.), diethylene glycol ethyl ether (bp about 189° C.), 2-(2-ethoxyethoxy)ethanol (bp from about 201° C. to about 202° C.), 2-pyrrolidone (bp about 245° C.), N-methyl-2-pyrrolidone (bp about 202° C.), 2-methyl-1,3-propanediol (bp about 212°), dimethylsulfoxide (bp about 189° C.), and combinations thereof.

The thermal inkjet ink disclosed herein generally does not include more than 5 wt % of a volatile co-solvent, where "volatile" is defined as a solvent having a boiling point lower than 75° C., and also does not include more than 3 wt % of a non-volatile co-solvent, where "non-volatile" is defined as a solvent having a boiling point greater than 250° C. An example of the volatile solvent include acetone (bp about 56° C.), and examples of the non-volatile solvent include triethylene glycol monoethyl ether (bp about 256° C.), tripropylene glycol n-butyl ether (bp about 274° C., commercially available from The Dow Chemical Co. as DOWANOL™ TPnB), and triethylene glycol (bp about 285° C.). In an example, the water-based vehicle can be devoid of any non-volatile solvent. In another example, the water-based vehicle can be devoid of any volatile solvent.

It is to be understood that water is not considered a solvent or co-solvent, but rather is present in addition to the organic co-solvent(s) and makes up a balance of the thermal inkjet ink. As such, the weight percentage of the water present in the thermal inkjet ink will depend, in part, upon the weight percentages of the other components. The water may be purified or deionized water.

The thermal inkjet ink also includes a colorant. In an example, the colorant is a pigment. As used herein, "pigment" may generally include organic or inorganic pigment colorants, magnetic particles, metal oxide particles, and/or other ceramics, organo-metallics, metallic particulates, or other opaque particles that introduce color to the inkjet ink composition. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No.

40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MON-ARCH® series manufactured by Cabot Corporation, Boston, Mass., (such as, e.g., REGAL® 400R, REGAL® 330R, REGAL® 660R, MOGUL® E, MOGUL® L, AND ELF-TEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal selected from the group consisting of gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® RO100, STANDART® RO200, and DORADO® gold-bronze pigments (available from Eckart Effect Pigments, Wesel, Germany).

Suitable metal oxide pigments may include, titanium oxide (i.e., $TiO_2$ or titania), zinc oxide, iron oxide, aluminum oxide (i.e., alumina), calcium oxide, barium oxide, or the like.

The average particle size of the pigments may range anywhere from about 10 nm to about 1000 nm. In an example, the average particle size ranges from about 80 nm to about 400 nm.

In some examples, the colorant may be a polymer dispersed pigment. In an example, the colorant is an anionically dispersed pigment. In an example, the anionically dispersed pigment is a dispersion including water, the pigment, and an anionic polymer (e.g., any of those listed herein for the binder) that disperses the pigment (i.e., the anionic polymeric dispersant).

In other examples, the colorant may be a self-dispersing pigment. As used herein, the term "self-dispersing pigment" refers to a pigment having water-solubilizing groups on the pigment surface. The self-dispersing pigment can be dispersed in water without the polymer dispersant. In an example, the self-dispersing pigment is obtained by carrying out surface modification treatments, such as an acid/base treatment, a coupling agent treatment, a polymer graft treatment, a plasma treatment, an oxidation/reduction treatment, on the pigment. Examples of the self-dispersion type pigment may include, in addition to the above described surface modified pigment, commercially available self-dispersion pigments such as CAB-O-JET®-200, CAB-O-JET®-300, CAB-O-JET®-400, IJX-157, IJX-253, IJX-266, IJX-273, IJX-444, IJX-55, CAB-O-JET®-250C, CAB-O-JET®-260M, CAB-O-JET®-270Y, CAB-O-JET®-450C, CAB-O-JET®-465M, CAB-O-JET®-470Y, and CAB-O-JET®-480M manufactured by Cabot Corporation, and Microjet Black CWI, and CW-2 manufactured by Orient Chemical Industries Co., Ltd.

The colorant may be present in thermal inkjet ink in an amount of 5 wt % or less (with the lower limit being above 0). In an example, the colorant ranges from about 0.1 wt % to about 5 wt % of the total wt % of the thermal inkjet ink. When the colorant is incorporated into the thermal inkjet ink in the form of a dispersion (e.g., including pigment, co-solvent, water, dispersant, etc.), the amount of the dispersion added is such that the weight percent of the colorant in the ink is within the given weight percent range.

Some examples of the thermal inkjet ink further include an anionic polymeric binder. The amount of the anionic polymeric binder may be present in the thermal inkjet ink in an amount of about 12 wt % or less. In some examples, the amount of the anionic polymeric binder ranges from about 1 wt % to about 10 wt %. In some examples, the amount of the anionic polymeric binder ranges from about 0.3 wt % to about 4 wt %.

Suitable anionic polymeric binders may be polymers having carboxylic acid groups (in the acid form or neutralized as carboxylate) incorporated in the polymer. The polymer may also contain other ionic or nonionic hydrophilic groups such as ether, hydroxyl, and amide groups. The water soluble/dispersible carboxyl group(s)-containing polymer may be copolymers of acrylates, methacrylates, styrene, substituted styrene, α-methylstyrene, substituted α-methyl styrenes, vinyl naphthalenes, vinyl pyrollidones, maleic anhydride, vinyl ethers, vinyl alcohols, vinyl alkyls, vinyl esters, vinyl ester/ethylene copolymers, acrylamides, and methacrylamides. The carboxyl group(s)-containing polymer may also be an anionic acrylic, styrene acrylic, polyester or polyurethane polymer.

The anionic polymeric binder may be in the form of a latex. As used herein, the term "latex" refers to a polymer that is capable of being dispersed in an aqueous medium. In an example, the polymer particles of the latex are heteropolymers or co-polymers. The heteropolymers may include a more hydrophobic component (i.e., low glass transition temperature ($T_g$) hydrophobic (soft) component(s)) and a more hydrophilic component (i.e., high $T_g$ hydrophilic (hard) component(s)). The $T_g$ of the two components may be defined in relation to each other (i.e., the high $T_g$ hydrophilic component(s) has a $T_g$ higher than the low $T_g$ hydrophobic component(s). In some examples, the high $T_g$ hydrophilic component(s) has a $T_g$ higher than 25° C. or higher than 50° C. and the low $T_g$ hydrophobic component(s) has a $T_g$ lower than 25° C. or lower than 50° C. In an example, the latex includes intermingled discrete polymer strands of the high $T_g$ and low $T_g$ components.

Examples of low $T_g$ monomers that may be used to form the hydrophobic component of the latex include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a high $T_g$ hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In the heteropolymers disclosed herein, the low $T_g$ hydrophobic component(s) make up from about 65% to about 100% of the polymer, and the high $T_g$ hydrophilic component(s) make up from about 0.1% to about 35% of the polymer.

In an example, the thermal inkjet ink includes the colorant present in an amount of 5 wt % or less, based on a total weight of the thermal inkjet ink; the anionic polymeric binder present in an amount of 12 wt % or less, based on the total weight of the thermal inkjet ink; the organic co-solvent present is present in an amount ranging from about 1 wt % to about 40 wt %, based on the total weight of the thermal inkjet ink; the modified siloxane surfactant is present in an amount of 1 wt % or less, based on the total weight of the thermal inkjet ink; and a balance of the water.

In some examples, the thermal inkjet ink may consist of the modified siloxane surfactant including the plurality of components, wherein each of the plurality of components has chemical formula I and/or II (as set forth above), the water-based vehicle, the colorant, and the anionic polymeric binder.

In other examples, the thermal inkjet ink may include the previously listed components, as well as an additive selected from the group consisting of a biocide, a pH adjuster, and combinations thereof.

In an example, the total amount of biocide(s) in the thermal inkjet ink ranges from about 0.1 wt % to about 0.5 wt % (with respect to the weight of the thermal inkjet ink). In another example, the total amount of biocide(s) in the inkjet ink composition is about 0.27 wt % (with respect to the weight of the thermal inkjet ink). Examples of suitable biocides include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 (Thor Chemicals), AXIDE™ (Planet Chemical), NIPACIDE™ (Clariant), and combinations thereof.

In an example, a pH of the thermal inkjet ink ranges from about 7 to about 9. pH adjuster(s) may be added to the thermal inkjet ink to counteract any slight pH drop that may occur over time. In an example, the total amount of pH adjuster (s) in the thermal inkjet ink ranges from greater than 0 wt % to about 0.5 wt % (with respect to the weight of the thermal inkjet ink). In another example, the total amount of pH adjuster(s) in the thermal inkjet ink is about 0.03 wt % (with respect to the weight of the thermal inkjet ink). Examples of suitable pH adjusters include metal hydroxide bases, such as sodium hydroxide (NaOH), potassium hydroxide (KOH), etc., or acids, such as hydrochloric acid (HCl), nitric acid ($HNO_3$), etc.

The thermal inkjet ink disclosed herein may be used in a thermal inkjet printer to generate a print. In an example, the print includes a non-porous plastic substrate selected from the group consisting of vinyl, polycarbonate, acrylic, polyethylene, and polypropylene; and an image formed on the non-porous plastic substrate with the thermal inkjet ink disclosed herein.

Examples of the colorless pre-treatment fluid will now be described. An example of the pre-treatment fluid includes a water-based vehicle; a cationic, polymeric fixing agent; an organic acid; and the modified siloxane surfactant including a plurality of components, wherein each of the plurality of components has chemical formula I (as set forth above). In some examples of the colorless pre-treatment fluid, the plurality of components in the modified siloxane surfactant may be represented by chemical formula II.

In some examples of the colorless pre-treatment fluid, each of the plurality of components (of the modified siloxane surfactant) has structure III (as set forth above). In these examples, for some of the plurality of components: y ranges from 2 to 3, x ranges from 7 to 14, and z is 0.

The water-based vehicle of the colorless pre-treatment fluid includes water and the organic-co-solvent having a boiling point ranging from 75° C. to 250° C. Any of the organic-co-solvent(s) previously described in reference to the thermal inkjet ink may be used in the colorless pre-treatment fluid. Whether used alone or in combination, the total amount of the organic co-solvent(s) may be present in the colorless pre-treatment fluid in an amount ranging from about 1 wt % to about 40 wt %. In an example, the organic co-solvent(s) may be present in the colorless pre-treatment fluid in an amount ranging from about 1 wt % to about 22 wt %.

The colorless pre-treatment fluid disclosed herein generally does not include more than 5 wt % of a volatile co-solvent, where "volatile" is defined as a solvent having a boiling point lower than 75° C., and also does not include more than 3 wt % of a non-volatile co-solvent, where "non-volatile" is defined as a solvent having a boiling point greater than 250° C. Examples of the volatile solvent and examples of the non-volatile solvent are provided herein with respect to the thermal inkjet ink. In an example, the water-based vehicle of the colorless pre-treatment fluid can be devoid of any non-volatile solvent. In another example, the water-based vehicle of the colorless pre-treatment fluid can be devoid of any volatile solvent.

It is to be understood that water is not considered a solvent or co-solvent, but rather is present in addition to the organic co-solvent(s) and makes up a balance of the colorless pre-treatment fluid. As such, the weight percentage of the water present in the colorless pre-treatment fluid will depend, in part, upon the weight percentages of the other components. The water may be purified or deionized water.

The colorless pre-treatment fluid also includes a cationic, polymeric fixing agent. Examples of the cationic, polymeric fixing agent include polyamines, poly quaternium compounds, polyallylamine, polyallylamine sulfate, polyallylamine hydrochloride, allylamine/diallylamine copolymer, allylamine/diallylamine copolymer sulfate, allylamine/diallylamine copolymer hydrochloride, allylamine/dimethylallylamine, allylamine/dimethylallylamine copolymer sulfate, allylamine/dimethylallylamine copolymer hydrochloride, diallylamine, diallylamine sulfate, diallylamine hydrochloride, methyldiallylamine amide, methyldiallylamine amide sulfate, methyldiallylamine amide hydrochloride, diallylamine sulfur dioxide copolymer, diallylamine sulfur dioxide copolymer sulfate, diallylamine sulfur dioxide copolymer hydrochloride, methyl diallylamine sulfur dioxide copolymer, methyldiallylamine sulfur dioxide copolymer sulfate, and methyldiallylamine sulfur dioxide copolymer hydrochloride. Some examples of suitable cationic polymers include cationic linear and structured poly quaternary amines. These cationic polymers are capable of aggregating ink by acting on the carboxyl groups on the surface of the pigment in an ink, on a dispersing polymer in an ink, or on polymer fine particles contained in an ink to prevent the ink from permeating into the media. As a result, the ink remains on the surface of the media to improve the color-developing property.

The cationic, polymeric fixing agent may be present in the colorless pre-treatment fluid in an amount of 12 wt % or less (with the lower limit being above 0). In an example, the cationic, polymeric fixing agent ranges from about 0.1 wt % to about 5 wt % of the total wt % of the colorless pre-treatment fluid.

Examples of the colorless pre-treatment fluid further include an organic acid. Examples of suitable organic acid include propionic acid, acinic acid, succinic acid, citric acid, or combinations thereof. The amount of the organic acid may be present in the colorless pre-treatment fluid in an amount of about 12 wt % or less (with the lower limit being above 0). In some examples, the amount of the organic acid ranges from about 1 wt % to about 10 wt %.

The colorless pre-treatment fluid does not include any colorant.

In an example, the colorless pre-treatment fluid includes the cationic, polymeric fixing agent in an amount of 12 wt % or less, based on a total weight of the colorless pre-treatment fluid; the organic acid present in an amount of 5 wt % or less, based on the total weight of the colorless pre-treatment fluid; the organic co-solvent present is present in an amount ranging from about 1 wt % to about 40 wt %, based on the total weight of the colorless pre-treatment fluid; the modified siloxane surfactant is present in an amount of 1 wt % or less, based on the total weight of the colorless pre-treatment fluid; and a balance of the water.

In some examples, the colorless pre-treatment fluid may consist of the modified siloxane surfactant including the plurality of components, wherein each of the plurality of components has chemical formula I and/or II (as set forth above), the water-based vehicle, the cationic, polymeric fixing agent, and the organic acid.

In other examples, the colorless pre-treatment fluid may include the previously listed components, as well as an additive, such as a biocide. Any biocide previously described may be used in the same amounts as previously described (except that the weight is respect to the weight of the colorless pre-treatment fluid).

In an example, a pH of the colorless pre-treatment fluid ranges from about 7 to about 2.1. The pKa of the organic acid dictates the pH of the colorless pre-treatment fluid.

The colorless pre-treatment fluid disclosed herein may be used in a thermal inkjet printer to pre-treat a medium. In an example, the medium includes a non-porous plastic substrate selected from the group consisting of vinyl, polycarbonate, acrylic, polyethylene, and polypropylene; and the colorless pre-treatment fluid is jetted onto at least a portion of the substrate where an image is to be printed thereon.

To further illustrate the present disclosure, examples are given herein. It is to be understood these examples are provided for illustrative purposes and are not to be construed as limiting the scope of the present disclosure.

EXAMPLES

Example 1

Examples of the colorless pre-treatment fluid (Example 1) and a black thermal inkjet ink (Example 2) disclosed herein were prepared with an example of the modified siloxane surfactant including longer and shorter siloxane chains (TEGO® Twin 4000 by Evonik). A comparative colorless pre-treatment fluid (Comp. Example 1) and a comparative black thermal inkjet ink (Comp. Example 3) were prepared with a fluorosurfactant (CAPSTONE™ FS-35 by DuPont). Another comparative colorless pre-treatment fluid (Comp. Example 2) and another comparative black thermal inkjet ink (Comp. Example 4) were prepared with a comparative siloxane surfactant including shorter siloxane chains (TEGO® Twin 4100 by Evonik) than the modified siloxane surfactant used in Examples 1 and 2.

Each ink and each colorless pre-treatment fluid had the same general formulation, which is shown in Table 1.

TABLE 1

| Ingredient | Specific Component | Black Inks Amount (wt %) | Colorless Pre-treatment Amount (wt %) |
|---|---|---|---|
| Pigment dispersion | Black pigment dispersion | 0.5-5 | N/A |
| Co-solvent | Diol | 1-22 | 1-22 |
|  | Glycol | 0.5-5 | 0.5-5 |
| Organic Acid | Succinic acid | N/A | <5 |
| Cationic, Polymeric Fixing Agent | Poly quaternium compounds | N/A | 0-12 |
| Surfactant | Siloxane or fluorosurfactant | 0.75 | 0.75 |
| Anionic Polymeric Binder | Latex including strands of high Tg (>50° C.) polymer and low Tg (<50° C.) polymer | 0-12 | N/A |
| Deionized Water |  | Balance | Balance |
| pH |  | 9 to 7 | 7 to 2.1 |

The example thermal inkjet ink, the example colorless pre-treatment fluid, and the comparative thermal inkjet inks, and comparative colorless pre-treatment fluid were tested for stability, in terms of surface tension and pH. Each example and comparative thermal inkjet ink and each example and comparative colorless pre-treatment fluid was stored in an accelerated storage (AS) environment at a temperature of 60° C. for one week, two weeks, and six weeks. For each example and comparative example, the surface tension and the pH were measured before and after the formulations were stored in the AS environment.

Additionally, each example and comparative thermal inkjet ink and each example and comparative colorless pre-treatment fluid was put through a T-cycle. During the T-cycle, each example and comparative thermal inkjet ink and each colorless pre-treatment fluid was heated to and maintained at a high temperature of 70° C. for 4 hours, and then each ink and pre-treatment fluid was cooled to and maintained at a low temperature of −40° C. for 4 hours. This process was repeated for each example and comparative example for 5 cycles. For each example and comparative example, the surface tension and the pH were measured before and after the T-cycle.

FIG. 2A illustrates the surface tension results for the colorless pre-treatment fluids (Example 1, Comp. Example 1, and Comp. Example 2) before accelerated storage and T-cycle (0 Wk), and after 2, 4, and 6 weeks of accelerated storage (Wk 2, Wk 4, Wk6), and after T-cycle. Comp. Example 1 was not tested after 6 weeks. The results clearly illustrate that the colorless pre-treatment fluid of Example 1 maintained its surface tension at a level suitable for printing on non-porous substrates. This was unlike Comp. Example 2 formulated with the shorter chain siloxane surfactant, which increased its surface tension over time in accelerated storage. The raw data is shown below in Table 2A in dynes/cm.

TABLE 2A

|  | Comp. Example 1 | Example 1 | Comp. Example 2 |
|---|---|---|---|
| Wk 0 | 21.90 | 20.65 | 26.57 |
| Wk 2 | 22.00 | 20.51 | 29.91 |
| Wk 4 | 21.80 | 20.51 | 30.03 |
| Wk 6 | N/A | 20.38 | 29.32 |
| Aft T-Cycle | 21.90 | 20.26 | 26.20 |

Figure 2B:
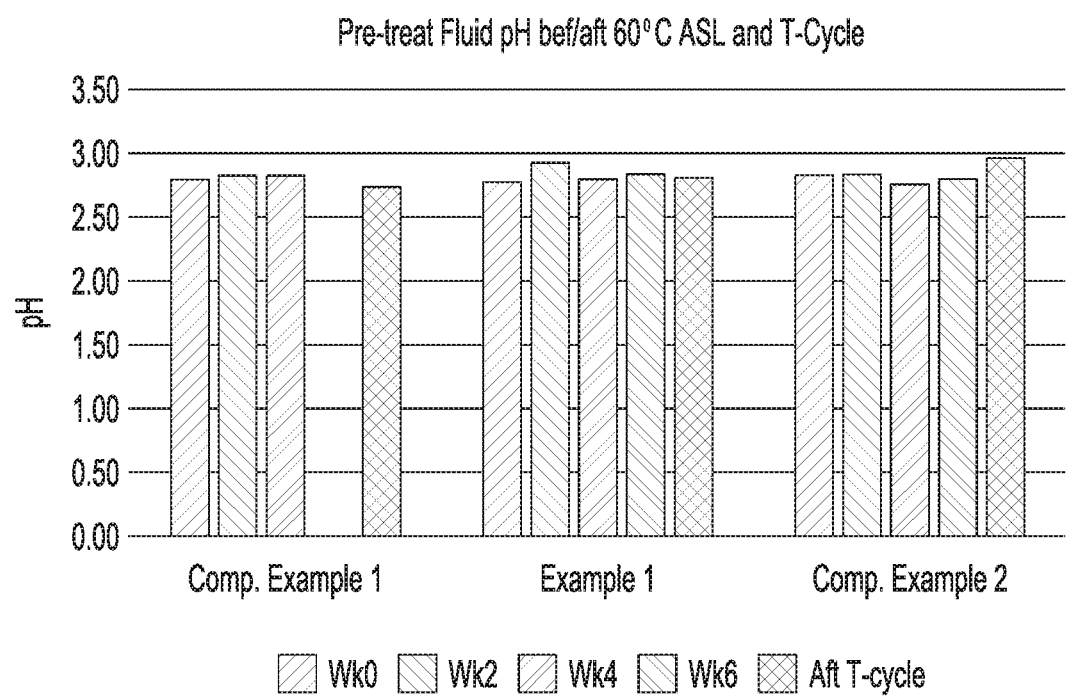
FIG. 2B is a bar graph depicting the potential of hydrogen (pH, Y-axis) of the different pre-treatment fluids before accelerated storage testing and temperature-cycle testing (i.e., Wk 0), and then at different time periods after accelerated storage (i.e., Wks 2, 4, 6) and after the temperature-cycle (i.e., Aft T-cycle)

FIG. 2B illustrates the pH results for the colorless pre-treatment fluids (Example 1, Comp. Example 1, and Comp. Example 2) before accelerated storage and T-cycle (0 Wk), and after 2, 4, and 6 weeks of accelerated storage (Wk 2, Wk 4, Wk6), and after T-cycle. Comp. Example 1 was not tested after 6 weeks. The results indicate that the hydrolysis of the shorter chain siloxanes in Comp. Example 2 does not impact the pH, like it does surface tension. The pH raw data is shown below in Table 2B.

TABLE 2B

|  | Comp. Example 1 | Example 1 | Comp. Example 2 |
|---|---|---|---|
| Wk 0 | 2.79 | 2.77 | 2.82 |
| Wk 2 | 2.82 | 2.92 | 2.83 |
| Wk 4 | 2.82 | 2.79 | 2.75 |
| Wk 6 | N/A | 2.83 | 2.79 |
| Aft T-Cycle | 2.73 | 2.80 | 2.96 |

Figure 3A:
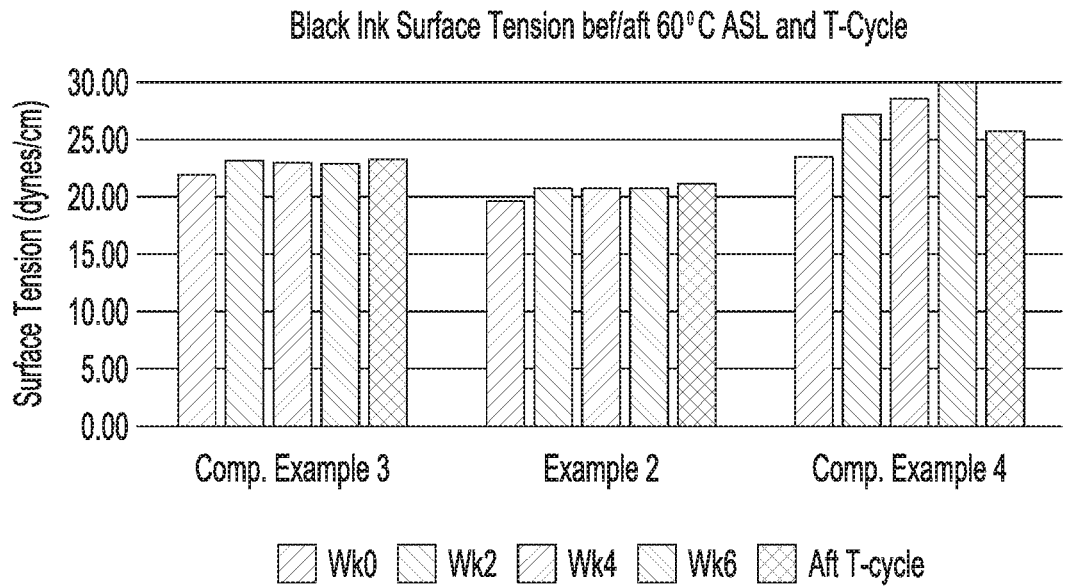
FIG. 3A is a bar graph depicting the surface tension (dynes/cm, Y-axis) of different black inks before accelerated storage testing and temperature-cycle testing (i.e., Wk 0), and then at different time periods after accelerated storage (i.e., Wks 2, 4, 6) and after the temperature-cycle (i.e., Aft T-cycle)

FIG. 3A illustrates the surface tension results for the black thermal inkjet inks (Example 2, Comp. Example 3, and Comp. Example 4) before accelerated storage and T-cycle (0 Wk), and after 2, 4, and 6 weeks of accelerated storage (Wk 2, Wk 4, Wk6), and after T-cycle. The results clearly illustrate that the colorless pre-treatment fluid of Example 2 maintained its surface tension at a level suitable for printing on non-porous substrates. This was unlike Comp. Example 4 formulated with the shorter chain siloxane surfactant, which increased its surface tension over time in accelerated storage and when exposed to the T-cycle. The increased surface tension Comp. Example 4 is likely the result of a higher hydrolysis percentage, and thus less surfactant components remaining after accelerated storage and the T-cycle. The raw data is shown below in Table 3A in dynes/cm.

TABLE 3A

|  | Comp. Example 3 | Example 2 | Comp. Example 4 |
|---|---|---|---|
| Wk 0 | 22.03 | 19.70 | 23.59 |
| Wk 2 | 23.25 | 20.82 | 27.30 |
| Wk 4 | 23.05 | 20.89 | 28.71 |
| Wk 6 | 22.98 | 20.80 | 30.16 |
| Aft T-Cycle | 23.37 | 21.23 | 25.86 |

Figure 3B:
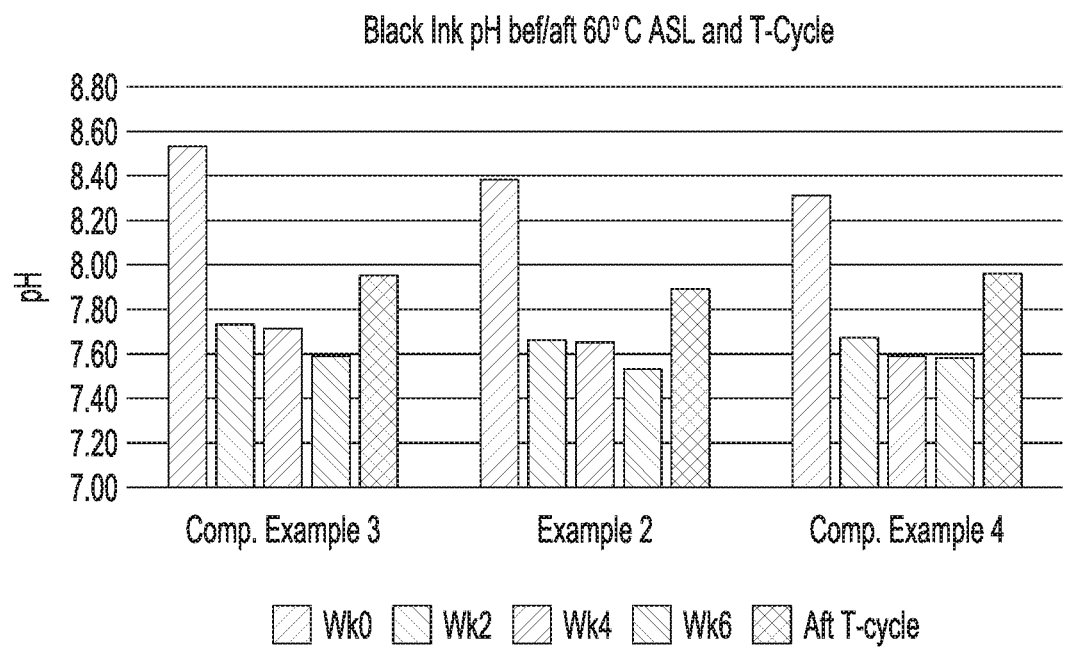
FIG. 3B is a bar graph depicting the potential of hydrogen (pH, Y-axis) of the different black inks before accelerated storage testing and temperature-cycle testing (i.e., Wk 0), and then at different time periods after accelerated storage (i.e., Wks 2, 4, 6) and after the temperature-cycle (i.e., Aft T-cycle)

FIG. 3B illustrates the pH results for the black thermal inkjet inks (Example 2, Comp. Example 3, and Comp. Example 4) before accelerated storage and T-cycle (0 Wk), and after 2, 4, and 6 weeks of accelerated storage (Wk 2, Wk 4, Wk6), and after T-cycle. These results indicate that both black inks with siloxane surfactants showed similar pH profiles as the Comp. Example 3 with the fluorinated surfactant. The decrease of pH after ASL and T-cycle in all of the inks followed the same mechanism, e.g., $CO_2$ absorption from the atmosphere or from acidic components released from the latex or pigment particles in the inks. The pH raw data is shown below in Table 3B.

TABLE 3B

|  | Comp. Example 3 | Example 2 | Comp. Example 4 |
|---|---|---|---|
| Wk 0 | 8.53 | 8.38 | 8.31 |
| Wk 2 | 7.73 | 7.66 | 7.67 |
| Wk 4 | 7.71 | 7.65 | 7.59 |
| Wk 6 | 7.59 | 7.53 | 7.58 |
| Aft T-Cycle | 7.95 | 7.89 | 7.96 |

Example 2

The modified siloxane surfactant (TEGO® Twin 4000 by Evonik) and the comparative siloxane surfactant (TEGO® Twin 4100 by Evonik) of Example 1 were analyzed by liquid chromatography-photodiode array-mass spectroscopy (LC-PDA-MS) to determine the types of siloxane chains that were present. The surfactants were each diluted by an eluent (a mixture of methanol and tetrahydrofuran (THF)) using a dilution factor of 100. The diluted solutions were analyzed.

Figure 4A:
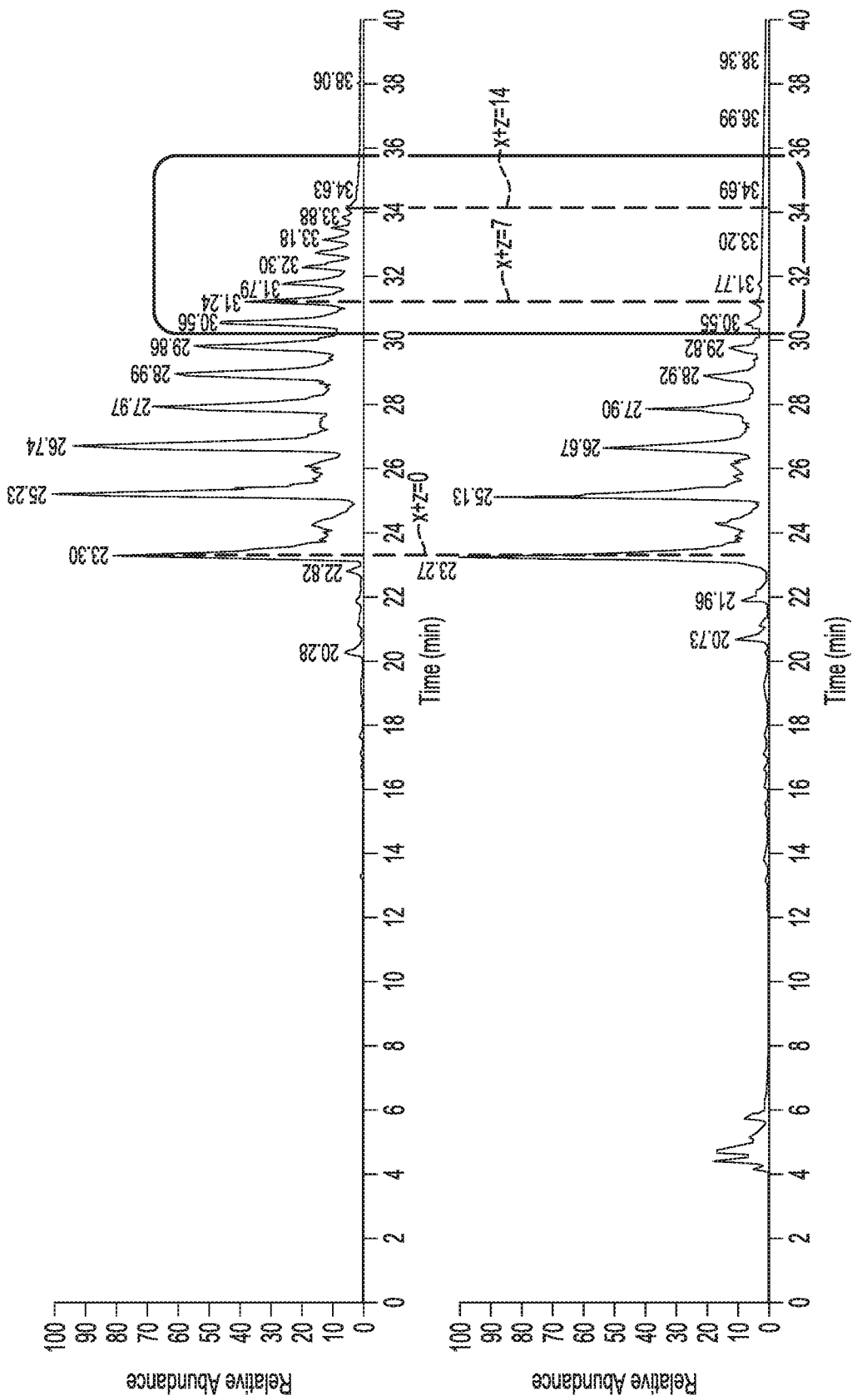
FIG. 4A depicts two liquid chromatography-mass spectroscopy (LC-MS) graphs, showing time (minutes, X-axis) versus intensity (relative abundance, Y-axis) for each of the plurality of components in an example modified siloxane surfactant (top graph) and a comparative siloxane surfactant (bottom graph)
Figure 4B:
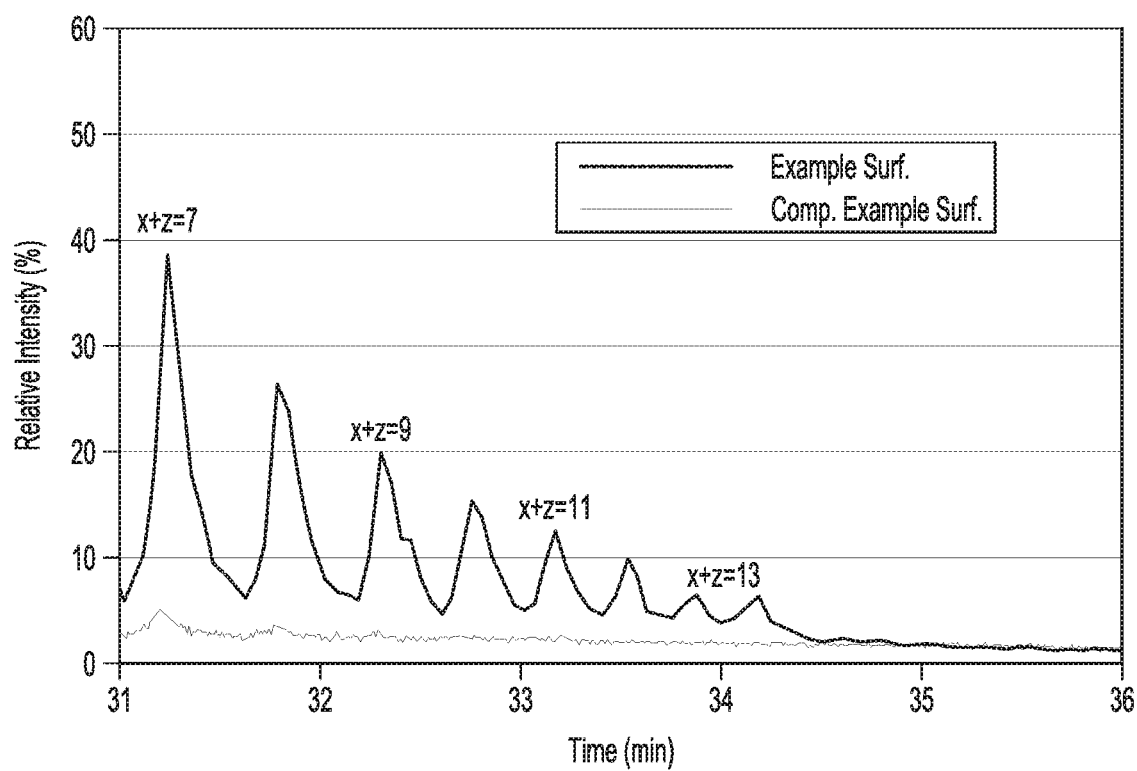
FIG. 4B depicts a portion, from time 31 minutes to time 36 minutes, of the top LC-MS in FIG. 4A.

The extracted ion current (EIC) MS chromatogram results are shown in FIG. 4A with the modified surfactant results at the top and the comparative siloxane surfactant results at the bottom. Some of the peaks are labeled x+z=#, where # increases by 1 each peak moving from left to right across the graphs. x+z represents the siloxane chain length for the particular component analyzed (and x and z are the same as shown in chemical formula I and structure III), and thus x+z=0 is the smallest siloxane chain length. Both of the surfactants have asymmetric peak intensity distribution, starting with the very short siloxane chain components (x+z=0 or 1) as the highest intensity peaks and monotonically descending with the increasing of the siloxane chain length. As can be seen in both FIGS. 4A and 4B (which is an enlarged portion of FIG. 4A), from x+z=7 to x+z=14, no signal was detected for the comparative siloxane surfactant, while the modified siloxane surfactant exhibited peaks for each of x+z=7 to x+z=14. This indicates that the comparative siloxane surfactant contains components with a shorter chain length range than the modified siloxane surfactant.

Example 3

The results in Example 1 indicate that the modified siloxane surfactant containing components with a longer chain length range can withstand an aqueous environment. This example was performed to determine whether at least some of the siloxane components of the modified siloxane surfactant do not undergo hydrolysis and decomposition in a water-based vehicle after accelerated storage.

A black thermal inkjet ink was prepared with an example of the modified siloxane surfactant including longer and shorter siloxane chains (TEGO® Twin 4000 by Evonik). The formulation was the same as shown in Example 1. The black ink was stored in an accelerated storage (AS) environment at a temperature of 60° C. for one week. The black ink was then centrifuged to remove the pigments, and the supernatants were collected and analyzed by LC-PDA-MS.

For comparison, the raw modified siloxane surfactant was also prepared and analyzed as described in Example 2.

Figure 5:
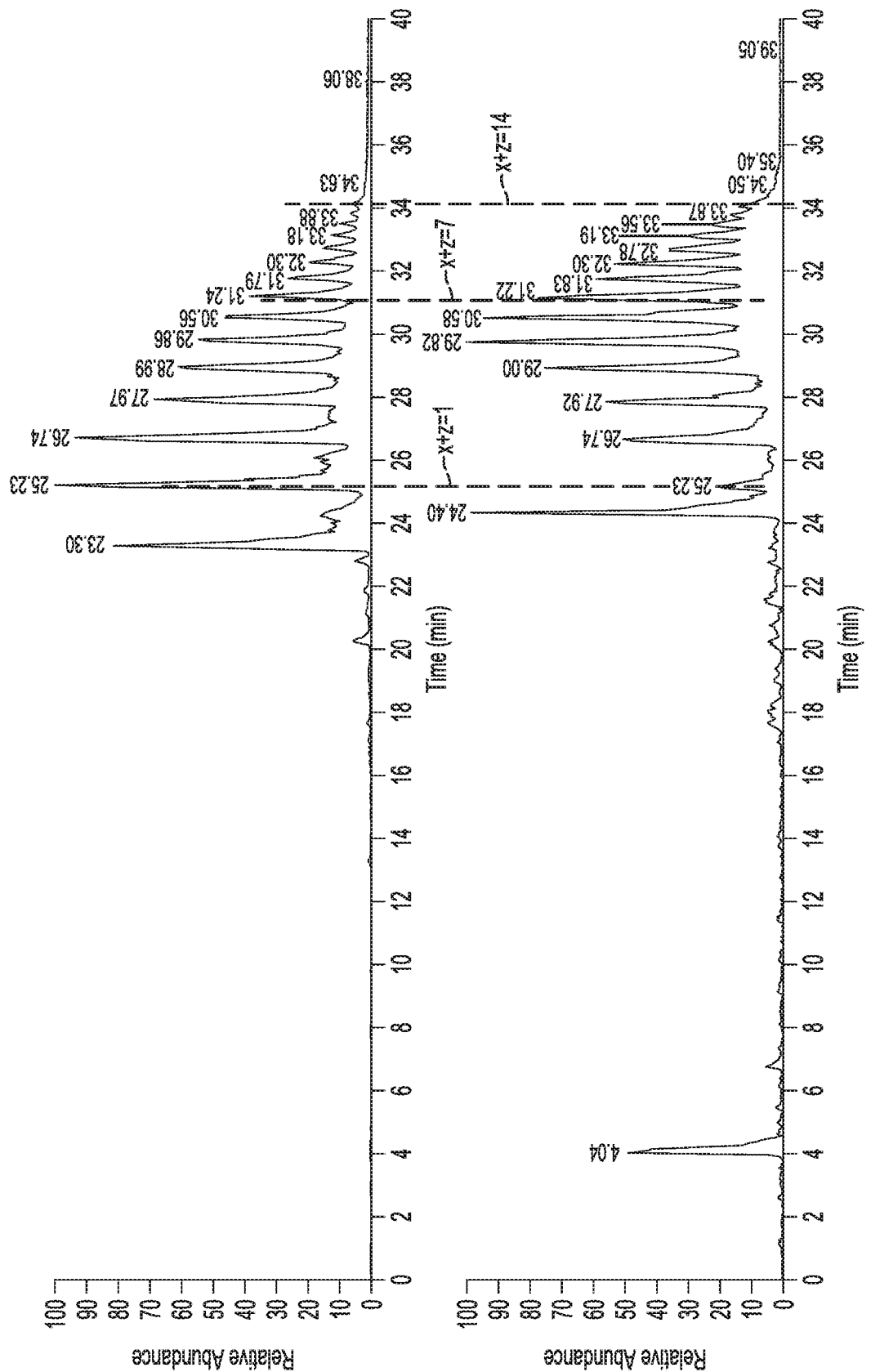
FIG. 5 depicts two LC-MS graphs, showing time (minutes, X-axis) versus intensity (relative abundance, Y-axis) for each of the plurality of components of an example modified siloxane surfactant before incorporation in a black ink (top graph) and after incorporation into the black ink (bottom graph).

The extracted ion current (EIC) MS chromatogram results are shown in FIG. 5 with the results for the raw modified surfactant results at the top and the results for the black ink after accelerated storage at the bottom. Similar to FIG. 4A, some of the peaks are labeled x+z=#, where # increases by 1 each peak moving from left to right across the graphs. As can be seen in the data for the modified siloxane surfactant in the black ink after accelerated storage, the peak intensities were reduced (as compared to the raw modified siloxane surfactant), especially for the lower siloxane chain lengths (x+z=0-5). This intensity reduction may be due to compound decomposition cause by hydrolysis. However, no significant intensity changes were observed for the components with longer siloxane chain lengths (x+z>5). This data was unexpected, and suggests that the hydrolysis primarily affects the lower siloxane chain components. This data, in addition to the data presented in example 1, indicates that the modified siloxane surfactant with the longer range of siloxane chain length is more stable in the water-based ink and pretreatment fluid disclosed herein.

A cyan ink was also prepared with a similar formulation as shown in Table 1, except with a cyan pigment dispersion and with the comparative siloxane surfactant. The cyan ink was exposed to accelerated storage, and then was analyzed by LC-PDA-MS. The raw comparative siloxane surfactant was also prepared and analyzed as described in Example 2. While not shown, the extracted ion current (EIC) MS chromatograms illustrated that the siloxane components of the comparative siloxane surfactant in the cyan ink nearly disappeared. By the peak area comparison, about 10% siloxane components remained in the cyan ink after accelerated storage. This data also indicated that the comparative siloxane surfactant contained the small siloxane chain lengths, which were easily decomposed during accelerated storage by hydrolysis.

It is to be understood that the ranges provided herein include the stated range and any value or sub-range within the stated range. For example, a range from about 1 wt % to about 40 wt % should be interpreted to include not only the explicitly recited limits of from about 1 wt % to about 40 wt %, but also to include individual values, such as 13 wt %, 18 wt %, 25.5 wt %, 37.8 wt %, etc., and sub-ranges, such as from about 5 wt % to about 30 wt %, from about 10 wt % to about 22 wt %, from about 15 wt % to about 35 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A thermal inkjet ink, comprising:
   a water-based vehicle;
   a colorant; and
   a modified siloxane surfactant including a plurality of components, wherein each of the plurality of components has a chemical formula I:

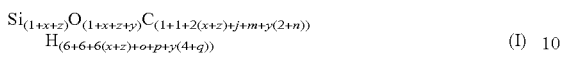  (I)

wherein for each of the plurality of components:
   y ranges from 2 to 4;
   x ranges from 0 to 14;
   z ranges from 0 to 14;
   x+z=from 0 to 14;
   j is a number of carbon atoms in $R_1$, wherein $R_1$ is an aryl;
   m is a number of carbon atoms in $R_2$, wherein $R_2$ is selected from the group consisting of an alkyl substituted with an allylic group, an alkyl substituted with an epoxy group, an aryl, an aryl substituted with an allylic group, and an aryl substituted with an epoxy group;
   n is a number of carbon atoms in $R_3$, wherein $R_3$ is selected from the group consisting of an alkyl substituted with an allylic group, an alkyl substituted with an epoxy group, an aryl, an aryl substituted with an allylic group, and an aryl substituted with an epoxy group;
   o is a number of hydrogen atoms in $R_1$;
   p is a number of hydrogen atoms in $R_2$; and
   q is a number of hydrogen atoms in $R_3$;
   and wherein for some of the plurality of components: x+z=from 7 to 14.

2. The thermal inkjet ink as defined in claim 1 wherein each of the plurality of components has a structure:

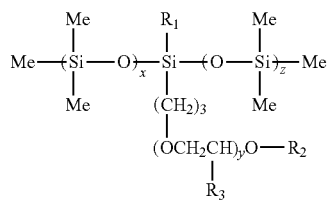

wherein Me is a methyl group, and x, y, z, $R_1$, $R_2$, and $R_3$ are each as defined for chemical formula I.

3. The thermal inkjet ink as defined in claim 2 wherein for the some of the plurality of components: y ranges from 2 to 3, x ranges from 7 to 14, and z is 0.

4. The thermal inkjet ink as defined in claim 1, further comprising an anionic polymeric binder.

5. The thermal inkjet ink as defined in claim 4 wherein the water-based vehicle includes an organic co-solvent having a boiling point ranging from 75° C. to 250° C. and water.

6. The thermal inkjet ink as defined in claim 5 wherein:
   the colorant is present in an amount of 5 wt % or less, based on a total weight of the thermal inkjet ink;
   the anionic polymeric binder is present in an amount of 12 wt % or less, based on the total weight of the thermal inkjet ink;
   the organic co-solvent is present is present in an amount ranging from about 1 wt % to about 40 wt %, based on the total weight of the thermal inkjet ink;
   the modified siloxane surfactant is present in an amount of 1 wt % or less, based on the total weight of the thermal inkjet ink; and
   a balance of the thermal inkjet ink is the water.

7. The thermal inkjet ink as defined in claim 1 wherein a pH of the thermal inkjet ink ranges from about 7 to about 9.

8. A print, comprising:
   a non-porous plastic substrate selected from the group consisting of vinyl, polycarbonate, acrylic, polyethylene, and polypropylene; and
   an image formed on the non-porous plastic substrate with the thermal inkjet ink as defined in claim 1.

9. A colorless pre-treatment fluid, comprising:
   a water-based vehicle;
   a cationic, polymeric fixing agent present in an amount of 9 wt % or less, based on a total weight of the colorless pre-treatment fluid;
   an organic acid; and
   a modified siloxane surfactant including a plurality of components, wherein each of the plurality of components has a chemical formula I:

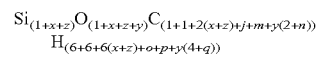

wherein for each of the plurality of components:
   y ranges from 2 to 4;
   x ranges from 0 to 14;
   z ranges from 0 to 14;
   x+z=from 0 to 14;
   j is a number of carbon atoms in $R_1$, wherein $R_1$ is an aryl;
   m is a number of carbon atoms in $R_2$, wherein $R_2$ is selected from the group consisting of an alkyl substituted with an allylic group, an alkyl substituted with an epoxy group, an aryl, an aryl substituted with an allylic group, and an aryl substituted with an epoxy group;
   n is a number of carbon atoms in $R_3$, wherein $R_3$ is selected from the group consisting of an alkyl substituted with an allylic group, an alkyl substituted with an epoxy group, an aryl, an aryl substituted with an allylic group, and an aryl substituted with an epoxy group;
   o is a number of hydrogen atoms in $R_1$;
   p is a number of hydrogen atoms in $R_2$; and
   q is a number of hydrogen atoms in $R_3$;
   and wherein for some of the plurality of components: x+z=from 7 to 14.

10. The colorless pre-treatment fluid as defined in claim 9 wherein each of the plurality of components has a structure:

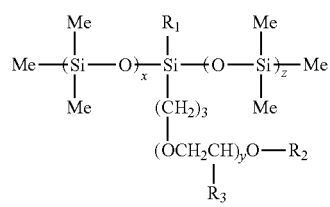

wherein Me is a methyl group, and x, y, z, $R_1$, $R_2$, and $R_3$ are each as defined for chemical formula I.

11. The colorless pre-treatment fluid as defined in claim 9 wherein for the some of the plurality of components: y ranges from 2 to 3, x ranges from 7 to 14, and z is 0.

12. The colorless pre-treatment fluid as defined in claim 9 wherein:
    the organic acid is present in an amount of 5 wt % or less, based on a total weight of the colorless pre-treatment fluid;
    an organic co-solvent having a boiling point ranging from 75° C. to 250° C. is present in an amount ranging from about 1 wt % to about 40 wt %, based on the total weight of the colorless pre-treatment fluid;
the modified siloxane surfactant is present in an amount of 1 wt % or less, based on the total weight of the colorless pre-treatment fluid; and
a balance of the colorless pre-treatment fluid is water.

13. A method, comprising:
incorporating a modified siloxane surfactant into a vehicle including water and an organic co-solvent having a boiling point ranging from 75° C. to 250° C., the modified siloxane surfactant including a plurality of components, wherein each of the plurality of components has a chemical formula I:

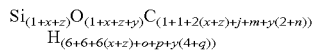
$$Si_{(1+x+z)}O_{(1+x+z+y)}C_{(1+1+2(x+z)+j+m+y(2+n))}H_{(6+6+6(x+z)+o+p+y(4+q))}$$

wherein for each of the plurality of components:
y ranges from 2 to 4;
x ranges from 0 to 14;
z ranges from 0 to 14;
x+z=from 0 to 14;
j is a number of carbon atoms in $R_1$, wherein $R_1$ is an aryl;
m is a number of carbon atoms in $R_2$, wherein $R_2$ is selected from the group consisting of an alkyl substituted with an allylic group, an alkyl substituted with an epoxy group, an aryl, an aryl substituted with an allylic group, and an aryl substituted with an epoxy group;
n is a number of carbon atoms in $R_3$, wherein $R_3$ is selected from the group consisting of an alkyl substituted with an allylic group, an alkyl substituted with an epoxy group, an aryl, an aryl substituted with an allylic group, and an aryl substituted with an epoxy group;
o is a number of hydrogen atoms in $R_1$;
p is a number of hydrogen atoms in $R_2$; and
q is a number of hydrogen atoms in $R_3$;
and wherein for some of the plurality of components: x+z=from 7 to 14.

14. The method as defined in claim 13, further comprising forming a thermal inkjet ink by incorporating a colorant and an anionic polymeric binder into the vehicle.

15. The method as defined in claim 13, further comprising forming a colorless pre-treatment fluid by incorporating a cationic, polymeric fixing agent and an organic acid into the vehicle.

16. A printing method, comprising:
thermal inkjet printing a colorless pre-treatment fluid onto at least a portion of a non-porous plastic substrate where an image is to be formed, wherein the non-porous plastic substrate is selected from the group consisting of vinyl, polycarbonate, acrylic, polyethylene, and polypropylene; and wherein the pre-treatment fluid includes:
a water-based vehicle;
a cationic, polymeric fixing agent present in an amount of 9 wt % or less, based on a total weight of the colorless pre-treatment fluid;
an organic acid; and
a modified siloxane surfactant including a plurality of components, wherein each of the plurality of components has a chemical formula I:

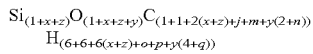
$$Si_{(1+x+z)}O_{(1+x+z+y)}C_{(1+1+2(x+z)+j+m+y(2+n))}H_{(6+6+6(x+z)+o+p+y(4+q))}$$

wherein for each of the plurality of components:
y ranges from 2 to 4;
x ranges from 0 to 14;
z ranges from 0 to 14;
x+z=from 0 to 14;
j is a number of carbon atoms in $R_1$, wherein $R_1$ is an aryl;
m is a number of carbon atoms in $R_2$, wherein $R_2$ is selected from the group consisting of an alkyl substituted with an allylic group, an alkyl substituted with an epoxy group, an aryl, an aryl substituted with an allylic group, and an aryl substituted with an epoxy group;
n is a number of carbon atoms in $R_3$, wherein $R_3$ is selected from the group consisting of an alkyl substituted with an allylic group, an alkyl substituted with an epoxy group, an aryl, an aryl substituted with an allylic group, and an aryl substituted with an epoxy group;
is a number of hydrogen atoms in $R_1$;
p is a number of hydrogen atoms in $R_2$; and
q is a number of hydrogen atoms in $R_3$;
and wherein for some of the plurality of components: x+z=from 7 to 14.

17. The printing method as defined in claim 16, further comprising thermal inkjet printing a thermal inkjet ink onto the at least the portion of the non-porous plastic substrate having the colorless pre-treatment fluid thereon.

* * * * *